US009438646B2

(12) United States Patent
Andler et al.

(10) Patent No.: US 9,438,646 B2
(45) Date of Patent: Sep. 6, 2016

(54) HOVER CARD

(71) Applicant: MYSPACE, LLC, Beverly Hills, CA (US)

(72) Inventors: Michael Scott Andler, Los Angeles, CA (US); James Andrew Beaupre, Los Angeles, CA (US); Eric Juhyun Kim, Tujunga, CA (US); Thomas Barraud Werz, III, Los Angeles, CA (US); Kyle R. Kincaid, Los Angeles, CA (US)

(73) Assignee: MYSPACE, LLC, Irvine, CA (US)

( * ) Notice: Subject to any disclaimer, the term of this patent is extended or adjusted under 35 U.S.C. 154(b) by 162 days.

(21) Appl. No.: 14/035,695

(22) Filed: Sep. 24, 2013

(65) Prior Publication Data

US 2014/0089819 A1    Mar. 27, 2014

Related U.S. Application Data (60) Provisional application No. 61/705,131, filed on Sep. 24, 2012.

(51) Int. Cl.

| | |
|---|---|
| *G06F 3/048* | (2013.01) |
| *H04L 29/06* | (2006.01) |
| *G06F 3/0482* | (2013.01) |
| *G06F 3/0484* | (2013.01) |
| *G06Q 50/00* | (2012.01) |

(52) U.S. Cl.
CPC ........... *H04L 65/403* (2013.01); *G06F 3/0482* (2013.01); *G06F 3/0484* (2013.01); *G06F 3/04842* (2013.01); *G06Q 50/01* (2013.01); *H04L 65/1069* (2013.01)

(58) Field of Classification Search
CPC ......................... G06F 3/0484; G06F 3/04842
USPC .................................................. 715/751, 753
See application file for complete search history.

(56) References Cited

U.S. PATENT DOCUMENTS

| | | | |
|---|---|---|---|
| 2008/0091692 A1* | 4/2008 | Keith et al. .................... 707/100 |
| 2009/0265326 A1* | 10/2009 | Lehrman et al. ................ 707/4 |
| 2011/0283236 A1* | 11/2011 | Beaumier et al. ............ 715/835 |
| 2012/0110052 A1* | 5/2012 | Smarr et al. .................. 709/201 |
| 2012/0210247 A1* | 8/2012 | Khouri et al. ................ 715/751 |

* cited by examiner

*Primary Examiner* — Ajay Bhatia
*Assistant Examiner* — Phuong Nguyen
(74) *Attorney, Agent, or Firm* — Gates & Cooper LLP (57) ABSTRACT

A method, apparatus, system, and computer program product display information about selected content in a social network. Multiple icons representative of content are displayed. Via input from a user, an item of the content is selected by selecting one of the multiple icons. In response to the selecting, a tooltip is displayed. The tooltip includes relevant information about the selected item and affinity data that provides a probability of similar interests between the user and the selected item.

14 Claims, 7 Drawing Sheets

HOVER CARD

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

U.S. Provisional Patent Application Ser. No. 61/705,131 filed on Sep. 24, 2012, entitled "Social Media and Information Discovery Graphical User Interface" by Benjamin Johnston, Jason J. A. Knapp, Ali Tahmasbi, Joshua Couch, Fabrizio Blanco, Timothy Charles Vanderhook, Christopher J. Vanderhook, and Michael S. Andler;

This application is related to the following commonly-assigned patent application(s), which is/are incorporated by reference herein:

U.S. patent application Ser. No. 14/035,655 filed on Sep. 24, 2013, entitled "System and Method for Connecting Users to Other Users and Objects in a Social Network" by Michael Scott Andler, which application claims the benefit of U.S. Provisional Patent Application Ser. No. 61/705,131 filed on Sep. 24, 2012, entitled "Social Media and Information Discovery Graphical User Interface" by Benjamin Johnston, Jason J. A. Knapp, Ali Tahmasbi, Joshua Couch, Fabrizio Blanco, Timothy Charles Vanderhook, Christopher J. Vanderhook, and Michael S. Andler;

U.S. patent application Ser. No. 14/052,484 filed on Sep. 24, 2013, entitled "Affinity-Tag Inheritance" by Michael Scott Andler, James Andrew Beaupre, Eric Juhyun Kim, Thomas Barraud Werz III, and Kyle Kincaid, which application claims the benefit of U.S. Provisional Patent Application Ser. No. 61/705,131 filed on Sep. 24, 2012, entitled "Social Media and Information Discovery Graphical User Interface" by Benjamin Johnston, Jason J. A. Knapp, Ali Tahmasbi, Joshua Couch, Fabrizio Blanco, Timothy Charles Vanderhook, Christopher J. Vanderhook, and Michael S. Andler;

U.S. patent application Ser. No. 14/035,799 filed on Sep. 24, 2013, entitled "Determining, Distinguishing, and Visualizing Users' Engagement with Resources on a Social Network" by Michael Scott Andler, Thomas Barraud Werz III, Eric Juhyun Kim, James Andrew Beaupre, and Timothy Charles Vanderhook, which application claims the benefit of U.S. Provisional Patent Application Ser. No. 61/705,131 filed on Sep. 24, 2012, entitled "Social Media and Information Discovery Graphical User Interface" by Benjamin Johnston, Jason J. A. Knapp, Ali Tahmasbi, Joshua Couch, Fabrizio Blanco, Timothy Charles Vanderhook, Christopher J. Vanderhook, and Michael S. Andler;

U.S. patent application Ser. No. 13/858,857 filed on Apr. 8, 2013, entitled "System and Method for Presenting and Managing Social Media" by Michael Scott Andler, James Andrew Beaupre, Eric Juhyun Kim, and Thomas Barraud Werz III, which application claims the benefit of U.S. Provisional Patent Application Ser. No. 61/621,057 filed on Apr. 6, 2012, entitled "System and Method for Presenting and Managing Social Media" by Mike Andler, James Andrew Beaupre, Eric Juhyun Kim, and Thomas Barraud Werz III;

U.S. patent application Ser. No. 13/858,720, filed on Apr. 8, 2013, by Michael Scott Andler, James A. Beaupre, Eric J. Kim, and Thomas B. Werz III, entitled "System and Method for Determining User or Resource Influence within a Pre-Defined Context", which application claims the benefit of U.S. Provisional Application Ser. No. 61/621,051, filed on Apr. 6, 2012, by Mike Andler, James Andrew Beaupre, Eric Juhyun Kim, and Thomas Barraud Werz III, entitled "System and Method for Determining User or Resource Influence within a Pre-Defined Context"; and U.S. patent application Ser. No. 13/858,727, filed on Apr. 8, 2013, by Michael Scott Andler, James A. Beaupre, Eric J. Kim, and Thomas B. Werz III, entitled "System and Method for Recommending Content", which application claims the benefit of U.S. Provisional Application Ser. No. 61/621,049, filed on Apr. 6, 2012, by Mike Andler, James Andrew Beaupre, Eric Juhyun Kim, and Thomas Barraud Werz III, entitled "System and Method for Recommending Content".

BACKGROUND OF THE INVENTION

1. Field of the Invention

This invention relates generally to social networks, and in particular, to a method, apparatus, and article of manufacture for displaying relevant information to a user in a social network based on user interaction on the social network.

2. Description of the Related Art

Prior art mechanisms provide limited mechanisms for discovering new content and users. For example, existing social network applications may attempt to predict potential users that a logged-in user knows and provide a listing of such potential users for the logged-in user to add as "friends". However, the prior art fails to provide a mechanism that determines a user's interests/affinities based on the user's actions followed by a presentation of both potential users/resources/content and/or a user's computed affinity with such a potential user/resource/content. To better understand the problems of the prior art, a description of prior art terminology may be useful.

Prior art systems provide an overcrowded social network behavior terminology with respect to a user expressing an interest in other users and content. Such terminology includes friending, following, fanning, liking, checking in, +1-ing, etc. Each of these concepts allows a user to uni-directionally indicate an interest in another user/object/content. As an example, a "friend" within the Facebook™ social network is someone that a user may connect and share with within the social network. In other words, to express an interest in another user within the Facebook™ social network, a user may be required to search for and add that user as a "friend". The added user must then "accept" that user as a friend to establish the "friend" relationship. Once friended, depending on the privacy/security settings established by the users, friends may have access to another friend's activity stream/updates, pictures, personal information, etc.

In addition to "friending," to express an interest or to provide positive feedback and connect with things a user cares about, the user may "like" a web page, another user's post, etc. For example, if a user desires to indicate an interest in a concert venue, the user must search for and find a social network page corresponding to that venue and "like" that page. Once the user "likes" the page, the user may have access to/view that page's activity stream.

Another term used in the prior art is "follow" which provides a mechanism for a user to see public updates from the people a user is interested in. A user "follows" another user and will receive updates from the followed user in his/her own user's "news feed." However, confusingly, if a user is interested in keeping up with a Page (e.g., businesses, organizations, bands, etc.), the user utilizes may be required to "like" the page.

"Fanning" is utilized in a similar manner to "liking" a page and refers to a user become a "fan" of their favorite page.

"Checking-in" refers to the concept where a user may "check-in" (e.g., using their mobile device/phone) at different places a user visits (e.g., bars, markets, concert venues, etc.). In other words, the user identifies a location that the user has visited using a "check-in" feature of a social network (e.g., on the Foursquare™ social network).

"+1-ing" refers to a method within the Google+™ social network for how a user shows their appreciation for a post/object. For example, a user may "+1" a post within the Google+™ social network by clicking a "+1" link/icon. Thereafter, the creator of the post and the people the post was shared with can see the user's "+1". Users can also "+1" something on a website which adds to the total number of "+1"s shown in a count for that item.

What is lacking from each of the above prior techniques is the ability to actually discover new users and content based on accurate and educated recommendations while allowing the user the opportunity to review how/why such new users/content are recommended. Instead, the prior art merely indicates that another user has "liked" such a page or how many mutual friends you have with a particular user. In other words, while prior art systems may recommend another user as a friend, or provide a targeted advertisement, or recommend a web page, all such recommendations are merely based on the present user's activities (e.g., what the user has liked, the user's current profile, etc.) and activities of friends of the present user. Further, such recommendations do not provide the ability for a user to view a detailed basis for such a recommendation.

In view of the above, one may note that a variety of methods are used across different social networks to indicate/express an interest in and to visualize their affinity to other users/objects within a social network. The number of different methods used can be confusing and repetitive and fails to provide a simple and easy to use and understand method/display for expressing an interest and visualizing a user's affinity.

SUMMARY OF THE INVENTION

Embodiments of the invention provide a hover card/tooltip, that is displayed whenever a user hovers over any content within an activity stream or elsewhere on a social network. The hover card displays relevant information about the item/content selected, a connection status with the content, recommendations based on such content, and an affinity score that is based on a relationship between the user and the item/content.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention. Embodiments of the invention include systems and methods for presenting and managing connections between users/objects on a social network.

Hardware Environment

Figure 1:
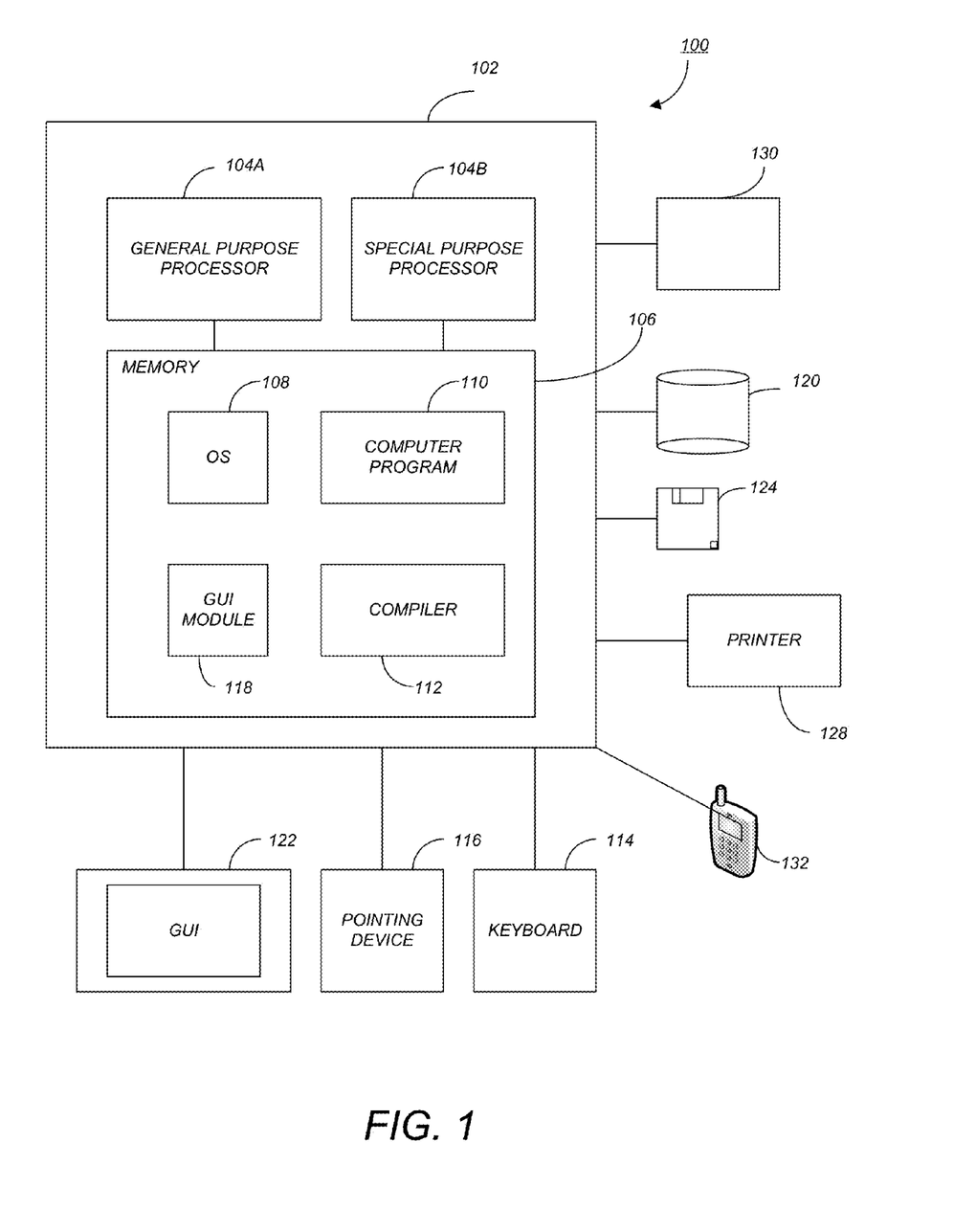
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
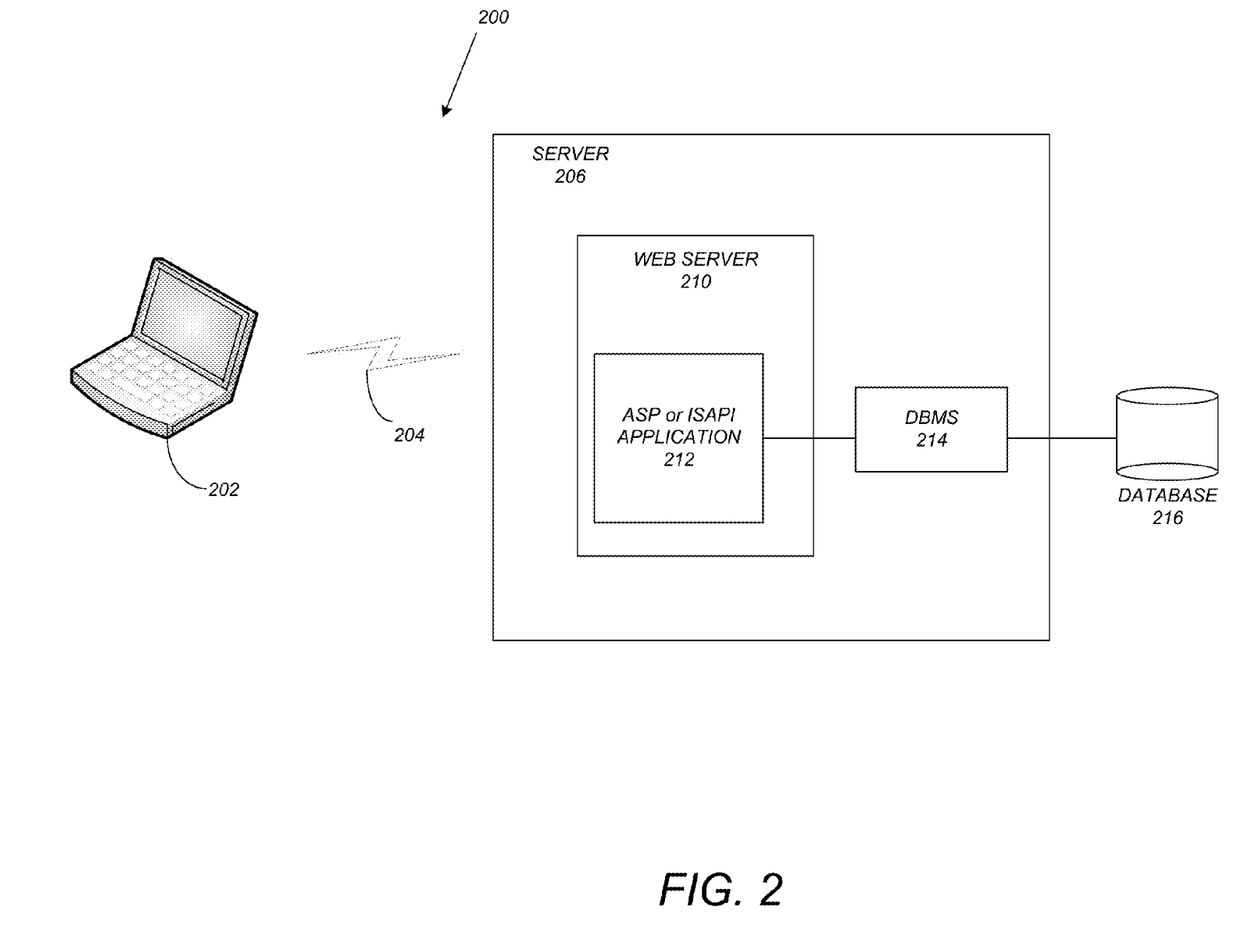
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROMET™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display (i.e., a tablet device), a mobile phone, a gaming system, an IP (internet protocol) enabled television, a television set top box, or other internet enabled device running on various platforms and operating systems. Users may communicate and interact with the software application using a mobile device, client computer 202, portable device, etc.

Figure 3:
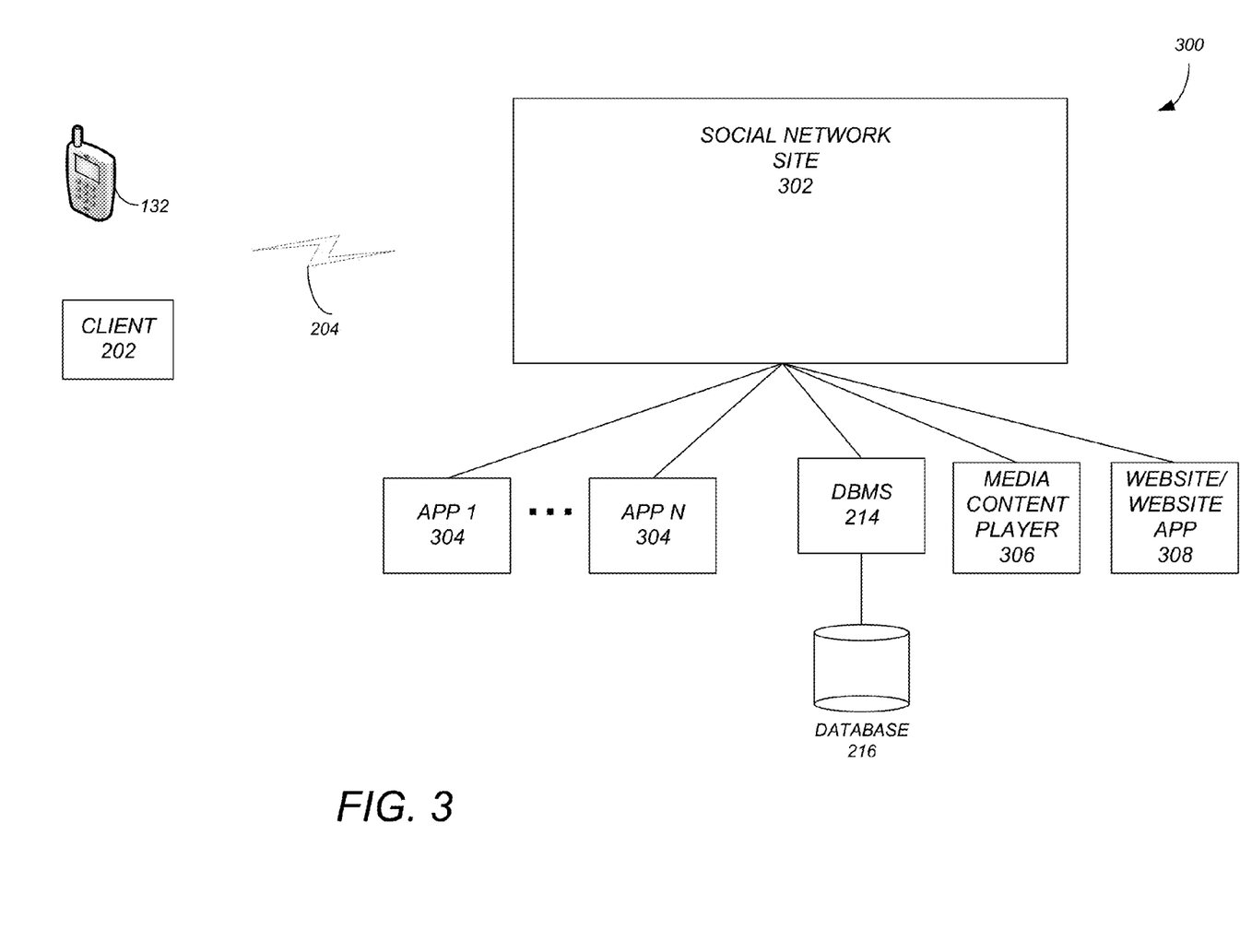
FIG. 3 illustrates the general structure and interaction within an social media network framework/system in accordance with one or more embodiments of the invention.

FIG. 3 illustrates the general structure and interaction within an social media network framework/system in accordance with one or more embodiments of the invention. As described above, mobile device 132 and/or client 202 (also referred to herein as user 202) may communicate and interact using a variety of networks 204 with various websites and applications. Mobile application software (commonly referred to as an "app") may be installed and/or utilized on mobile devices 132 and/or clients 202. Such an app may be downloaded from an application marketplace or online store of applications. The app may be used to provide the functionality herein. In addition, various apps may be used in combination with server side applications to provide the desired functionality. For example, a user 202/132 may install an app on his/her smart phone or tablet device (e.g., iPad™) that is configured to communicate with a social network site 302 and display relevant information on the user's device. Information displayed via the app on the user's device may be pushed to the user's device or pulled from the site 302 depending on the configuration of the app.

On the server side 206, a social network site 302 (e.g., Myspace™ Facebook™, LinkedIn™, Friendster™, Twitter™, Foursquare™, Pinterest™, Instagram™, etc.), may provide an interactive experience to a variety of users 202/132 that access such a social network site 302. Users 202/132 may access social network site 302 via a web browser or via an app on the user's device.

Users 202/132 accessing a social network site 302 may be members of site 302 or may access information without being members. In this regard, access to a site 302 or certain areas of site 302 may be limited to users 202/132 that are members and are logged in to such a site 302. Such a logon may be automatic (e.g., preconfigured using cookies on a web browser or by storing a username/password on the user's device or in the app on the user's device).

Either as part of the social network site 302 or executing separately from the social network site 302, various applications 304-308 may be used to provide additional features to the social network site 302. It may be noted that the description is not limited to the applications depicted in FIG. 3 and additional applications may be used to provide the features described herein. Further, such applications 304-308 may be directly integrated with (e.g., are an integral part of) social network site 302, may interact with each other, and or may interact directly with the user 202/132.

Apps 304 may provide a variety of functionality ranging from games, to facial recognition, to media content discovery, etc. For example, one app 304 may consist of a recommendation engine that is configured to recommend content, events, etc. to a user 202/132 (e.g., based on content gathered and/or stored by social network site 302). DBMS 214 manages all of the data that may be stored in database 216. Media content player 314 enables the ability to view media content uploaded by users 202/132 (or uploaded by a host of site 302). Websites/website apps 308 are websites other than the social network site 302 (e.g., Twitter™, search engines, map-based interactions, etc.) that may use information from social network site 302 or provide additional information based on the social network information.

The platform and processing capabilities that provide an integrated graphical user interface that displays connectivity status and affinity between users/objects and may be performed by client 202, server 206, and/or a combination of client 202 and/or server 206 within a social network.

As used herein, a "social network" (or social network site) refers to a platform or service (e.g., website, web service, application, etc.) that enables users to build social relations based on shared interests, activities, backgrounds, and/or real-life connections. A social network provides a representation of each user (e.g., a profile), his/her social links, and a variety of additional services. As described above, many social networks/sites 302 are web-based and provide means for users to interact over a network 204 (e.g., the Internet, e-mail, and instant messaging). Social networking sites 302 allow users to share ideas, pictures, posts, activities, events, and interests with people in their network. Further, social networking sites 302 provide an electronic/computer-implemented means/representation of a social structure made up of a set of social actors (e.g., individuals or organizations) and a set of connections between such actors. In addition to providing the ability for users to connect to one-another, a social network 302 may also enable users to connect with groups (e.g., music groups), objects, locations, etc. However, embodiments of the invention are not intended to be limited to the social networks 302 described above but intend to cover any type of social network 302 where users can connect/communicate with one another and objects via electronic means.

Affinity Analysis and Presentation

Embodiments of the invention perform an affinity analysis that is a data analysis and data mining technique that discovers co-occurrence relationships among activities performed by specific users 202/132 or groups of users 202/132 and their interaction with site objects. Such an affinity analysis may be based on tag inheritance, which is described in further detail below. The scoring is surfaced/provided/displayed to the user using a graphical user interface referred to as the hover card or H-card and/or within a discover section of a social network site 302.

The discover section of a social network site 302 provides an area that allows the user 202/132 to explore new content based on curated recommendations. For example, a discover section may provide sophisticated charts of popular music, videos, people, personalized recommendations, new releases, editorial content, interesting users, etc. In other words, the discover section provides users 202/132 with the ability to discover new content and/or users in an efficient and easy to use manner. Further, a recommendations section within a discovery section/area of a social network 302 is a personalized offering that takes into account all of the people, music, and content to which a user has connected, in order to generate targeted recommendations for new music, videos, users, mixes, etc. (e.g., based on tags and tag inheritance as described below). By enabling users to see what's happening around them, the discover section of a social network 302 allows users to filter content and users by genre, and utilize prior activities of the user (e.g., listening, connection history as defined in the related applications cross-referenced and incorporated by reference above), a user's identity may be built, modified, and enhanced over time.

To display information relevant to a particular object/content within a social network site, a user 202/132 may hover (e.g., using a mouse/tablet/cursor control device) over a particular piece of content within a user's activity/news stream. Such an activity/news stream is a list of recent activities performed by an individual (and/or activities of other users/content that the present user has opted to "connect" with). In other words, an activity/news stream provides updates, news, etc. for content and other users that the present user has opted to "connect" with, follow, friend, etc.

Figure 4:
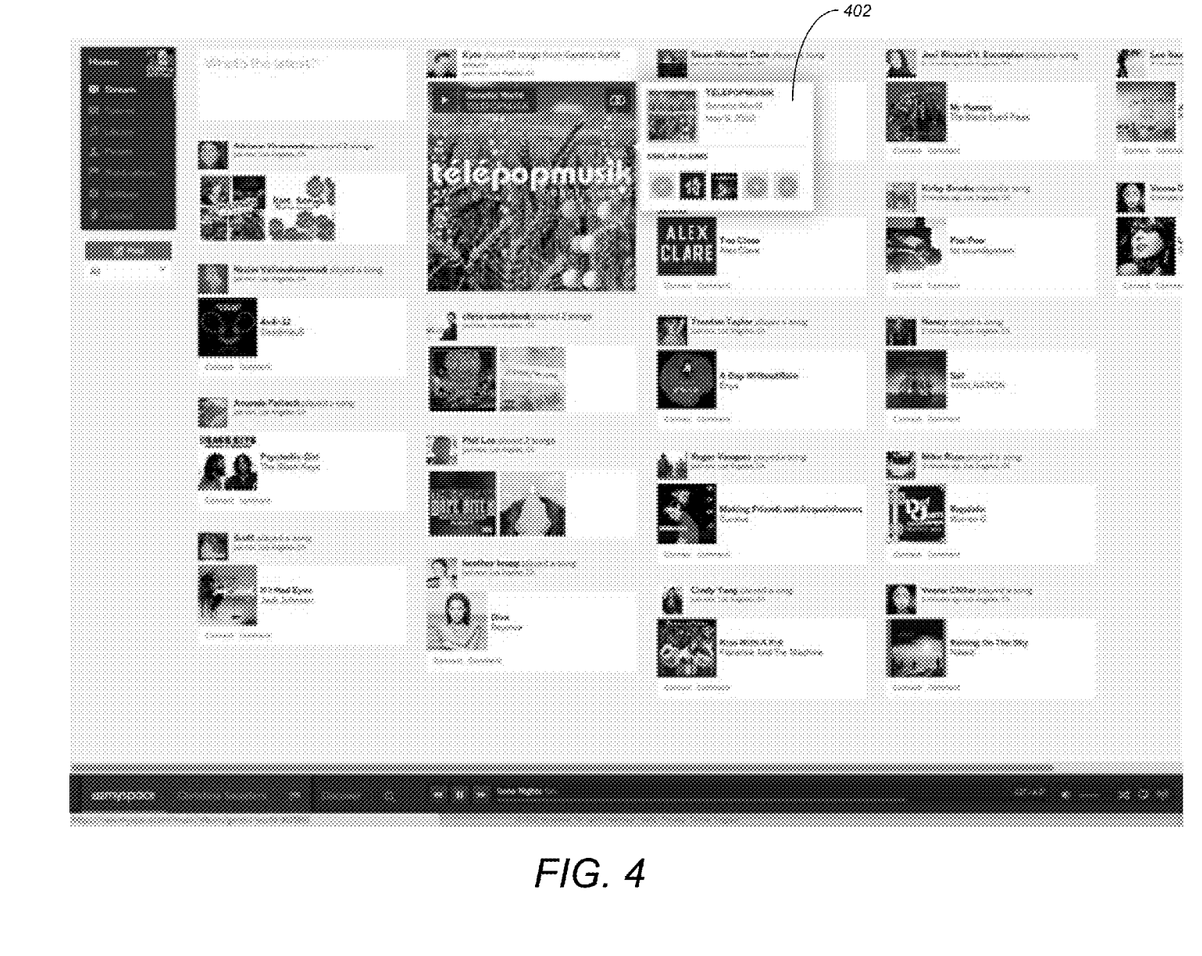
FIG. 4 illustrates the display of a hover card in accordance with one or more embodiments of the invention.

When a user hovers over any content within the user's activity stream, a tooltip or information box may appear that is referred to herein as the hover card, or H-card. FIG. 4 illustrates the display of an H-card in accordance with one or more embodiments of the invention. As illustrated, the H-card displays relevant information about the item selected. For content, it will display the name of the content, the user's connection status with the content (e.g., see the related application entitled "System and Method for Connecting Users to Other Users and Objects in a Social Network" cross-referenced above and incorporated by reference herein), release date, similar artists, etc. For mixes, the H-card will display the artists featured within the mix. For other users, the H-card includes that user's name, mutual connections, profile song, and other user information. Note that a user's profile song may be displayed with the user wherever information of that user is displayed.

In addition, the H-card may display recommendations to objects/people/entities for the user. For example, if the user hovers over a song, similar songs may be displayed on the H-card (e.g., as a recommendation to the user of a particular song, group, genre, etc.).

In addition to the above, embodiments of the invention may surface affinity data within the H-card, thereby providing/displaying an affinity score, that visualizes the probability of similar interests based on aggregated data. Technically, affinity analysis is a data analysis and data mining technique that discovers concurrent relationships among activities performed by specific users or groups. In other words, affinity scores show how similar a logged-in user's interests are compared to a specific user, artist, or piece of content. Using the affinity score, discovery is improved by making it easier for a user to discover thinks the user actually likes. Further, the affinity score may be used to sort information and/or to discover new people/objects that share common affinities.

Figure 5:
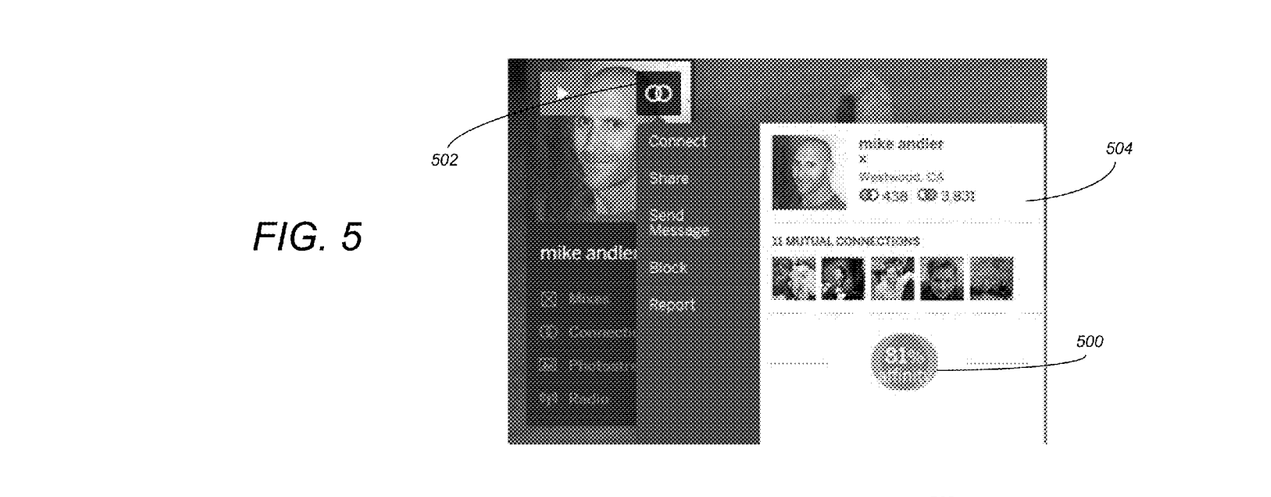
FIG. 5 illustrates an exemplary display of a hover card when hovering in association with a user in accordance with one or more embodiments of the invention.
Figure 6:
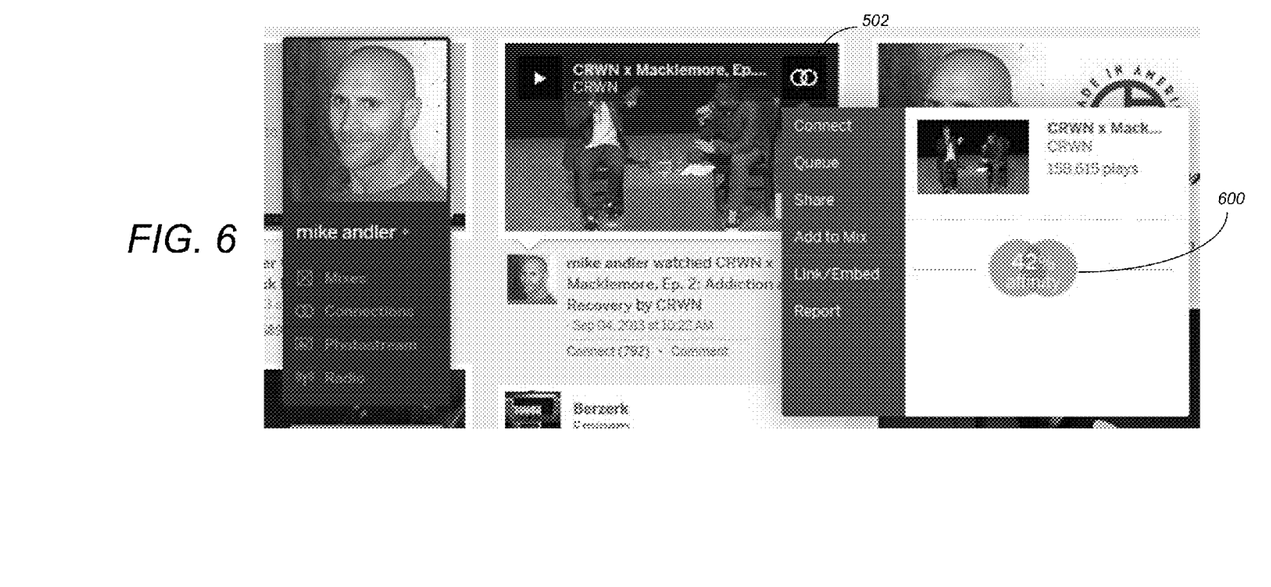
FIG. 6 illustrates an exemplary display of a hover card when hovering in association with a video resource in accordance with one or more embodiments of the invention.

FIGS. 5 and 6 illustrate H-cards with an affinity illustrated in accordance with one or more embodiments of the invention. Within the H-cards, the affinity 500/600 is illustrated as a Venn diagram. The more closely related the user is to the hovered-over entity/object, the greater the percentage illustrated and the greater the overlap of the two circles in the Venn diagram. Adjacent to the Venn diagram may be text based information that is used to define the affinity (e.g., "98% Musical Taste, 16% Demographic, 0% Music", etc.). Such text would indicate the computed percentage of similarity in the particular category specified (e.g., musical taste, demographic, music, etc.).

In FIG. 5, the user has hovered over the connection icon 502 associated with "Mike Andler". The H-card 504 displays information about Mike Andler, indicates there are 11 mutual connections between the logged-in user and Mike Andler, and an affinity score 500 of 81%. The Venn diagram illustrating the affinity score 500 shows circles that are significantly overlapped thereby reflecting the 81% affinity score that is displayed along with the Venn diagram.

In FIG. 6, the logged-in user is viewing Mike Andler's stream and has hovered over a connect icon 502 associated with the icon representing the video "CRWN× Macklemore, . . . " The affinity score indicates an affinity of 42% and the circles of the Venn diagram overlap in an amount reflective of 42%.

The affinity computation may be defined as an average, a mean, or any other type of computation (including a computation that weights different attributes depending on the importance to the user). Embodiments of the invention are not intended to be limited to any particular method for computing/calculating the affinity value.

Further to the above, embodiments of the invention may base an affinity computation based on two different types of affinities—behavioral and categorical. Behavioral affinity refers to the concept of things an entity does. In other words, behavioral affinity refers to the concept of affinity values based on the behavior or action of a user with respect to a particular resource/type of resource. As an example, suppose there is no known information about two users except that both users have played the same single song. Such users would have a strong affinity based on behavioral affinity (i.e., they both played the same song). As another example, behavioral affinity is based on a repeated performance of an action or particular type of action. For example, if a user creates a large number of music mixes and/or listens to a large number of songs, that user may have a behavioral affinity to another user that also creates a large number of mixes. Similarly, if a user views a large number photographs, that user may have a behavioral affinity to another user that also views a large number of photographs. Further information relating to the category/types of information involved in the action may also impact the behavioral affinity. Continuing with the above examples, if the mixes created by the two users are both in the same genre of music (e.g., rock music), it may increase the affinity. However, if the mixes are in different genres, while the mix creation action itself may result in a positive affinity between the two users, the difference in genres may reduce the affinity (e.g., versus a resulting affinity from the same genre).

In contrast, categorical affinity is based on information known about an entity (e.g., demographic information [such as gender, age, city, state, country, marital status, etc.], personal information about a user [e.g., sexual orientation, movie preferences, religion, etc.], attributes of an object entity [e.g., color, location, etc.], attributes of a business entity [e.g., type of establishment such as restaurant, retail, etc.].

Embodiments of the invention may utilize the mechanism of tag inheritance described herein to identify both the behavioral and categorical affinity between two resources/entities. In this regard, when tags are exchanged between two entities as described herein, the action catalyzing the tag exchange may be utilized as the basis to determine the behavioral affinity. Similarly, resulting tags may provide for the categorical affinity. The description below of tag inheritance further details such a process.

In addition, when determining the affinity between two entities/resources, different weights/prioritization's may be applied to different tags/categories of tags. For example, a song may have a different categorization/priority than that of an event or a person. Further, determining the affinity between two songs is different from that of determining the affinity between two people. Accordingly, based on the category of both resources being compared, the tags may be weighted/prioritized differently to compute an affinity value. In addition, as described above, a user may determine what attributes/values are more important than others thereby resulting in a weighting of tags/categories.

As an example, if the affinity value is being computed for the relationship between a user and a song, the genre tags associated with the user and the song are likely to be weighted heavily during the affinity computation. Similarly, the residence location of the band and the residence of the user may not be accorded as much weight as the genre. In addition, other factors may be utilized to compute the affinity (e.g., whether the user's friends like the song and/or the artist/band that recorded the song and/or the composer of the song, etc.).

In view of the above, tag inheritance and the process of tag inheritance may be used to identify the affinity between two entities. Such an affinity may be based on a combination of the tags (e.g., similar genre tags such as two songs that both have a strong rock song affinity tags), photographs (e.g., a photograph of one car and a photograph of another car), profile, behavior, etc. In this regard, any and all factors, behavioral and categorical may be utilized to determine the affinity value/score between two entities. As an example, even if two users have very dissimilar music tastes, if both users actions indicate postings/connections to outdoor related activities (e.g., hiking, backpacking, swimming, etc.), an affinity between the two users may be established. Similarly, if both users connect with different baseball teams, but appear to both frequently attend professional baseball games, an affinity between the users may be established. Thus, in addition to the specific tags associated with each user, the category/type of tags, the number and consistency of tags in such a category/type, and the behavior utilized to acquire such tags may be used to perform such a computation.

An affinity value may be computed and displayed between any two entities including a user-user and user-object/entity. The affinity value may also be used as part of the computation to measure the influence of the user as set forth in the above-identified cross-referenced patent applications.

As described above, the affinity between two entities (e.g., a user and another user/resource) may be surfaced/provided/displayed via a graphical user interface of a social network site (e.g., via an H-card as described above).

Connect Feature

The H-card may not only display the affinity Venn diagram as described above, but may also include an indication of a current connection status between the logged-in user and the content. In addition, the H-card may also display the connections status between the item/resource in question and other users/content. To better understand such a "connection status," a description of the connect feature of embodiments of the invention is useful.

The connect feature provides the ability for a user to connect to any piece of content or any user 202/132. In this regard, after logging in, a user 202/13 (e.g., a registered user/member) of a social network 302 may have the ability to connect to any of the following—people, artists, songs, videos, photos, albums, mixes (photos, music, etc.), etc. Connections are one-sided relationships—meaning that if a first user connects to a second user, the second user doesn't have to approve or connect back to the first user if they choose not to (except if the user is private, in which case they may have to approve a connection request). In this regard, privacy settings (of a logged-in user) may determine whether users can/cannot connect to a logged-in user. Such privacy settings may depend on whether a logged-in user's profile is public or private. If a logged-in user has a public profile, any user can connect to the logged-in user the logged-in user will receive a notification each time a user connects to the logged-in user. If a profile is private, the logged-in user will receive a notification each time a user initiates a connection with the logged-in user and the logged-in user will be prompted to approve or deny each request.

Accordingly, notwithstanding the specific case of a private user, once a first user has decided to connect to a second user, even that one-way connection allows the first user to see and comment on the second user's activities. If the second user chooses to connect back to the first user, then the mutual connection will allow the second user to see and comment on the first user's activities as well.

In view of the above, establishing a connection with other users, or artists, allows a logged-in user to view the other user's/artists latest activity. It may also expand a logged-in user's social graph and enable the logged-in user to explore shared connections, both people and content. Similarly, connecting to an object/piece of content (e.g., song, photograph, video, album, or mix), adds the object/content to the logged-in user's personal library for easy access and also places the object/content in the logged-in user's stream, making it visible to all of the logged-in user's connections, or the public, depending on the logged-in user's privacy settings. Connecting to content also improves a social network's ability to make recommendations for additional content the logged-in user may enjoy.

Such a connection feature simplifies the concept of "following", "friending", "liking", or "adding" a user or piece of content—unifying a user's association with any object (users, photos, mixes, albums, songs, videos, etc.) on the social network site. Further, such a connection configuration provides a more accurate representation of relationships on the site (e.g., a user may follow an artist, but that artist doesn't need to follow the user back for the user to see their activity).

Connecting to users and content helps a social network website collect more information on the user's interests (which may be used in the calculation of an "affinity" as described in related applications and also helps a social network site deliver better recommendations to users/members).

In view of the above, while the "connect" feature provides the ability for a user to "connect" to other users/objects, a "connections" feature organizes everyone (e.g., friends, artists) and everything (e.g., songs, images, albums) to which a user is connected. Connections may be accessed using a button within a social network website/application (e.g., within a contextual navigation menu) and can be filtered by type (e.g., the type of connection such as people [user-user], songs [user-song], albums [user-album], videos [user-video], photos [user-photo], etc.) (e.g., using a drop down menu or other selection technique). In addition, a "Top 8" feature allows a social network user to select up to eight (8) personal connections to be highlighted by displaying them directly on the user's profile (e.g., within a social network). Such a top 8 is determined by the user (unlike a Top Fans feature which may be computed based on the level of interaction the user has with another user/group/object/etc.). In addition, a logged-in user may view all content/people to which the user has connected by visiting a library section found within a logged-in user's homepage. Such content/people in the library may be segmented by type.

Figure 7:
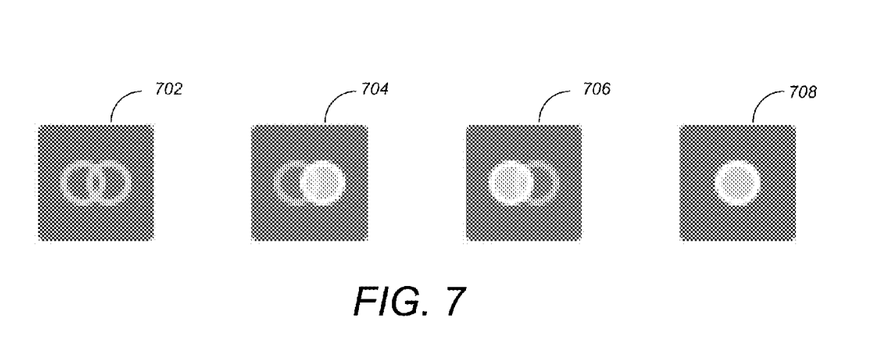
FIG. 7 illustrates the logical flow for inheriting tags in accordance with one or more embodiments of the invention.

FIG. 7 illustrates exemplary symbols utilized to represent connections in accordance with one or more embodiments of the invention. Overlapping circles represent connections—much like a Venn diagram. The circles can be clicked like buttons to create, reciprocate or remove a connection. Thus, a user can simply click on one of the connection symbols 702-708 and the shading of the circles may change to indicate the change in the connection. In this regard, a change in the status of a connection will cause the symbol to change its appearance/state as described below. The transition from one state to another state may be animated (e.g. performed via an animation). Symbol 702 indicates that no connection exists between a logged-in user (e.g., you) and the object/user. Symbol 704 indicates that a user/object has connected to the logged-in user (e.g. you), but the logged-in user has not connected to the user/object. Symbol 706 indicates that the logged-in user has connected to a user/object, but the user/object has not connected to the logged-in user. Symbol 708 indicates a two-way connection (i.e., both the logged-in user and the user/object have connected to each other). In one or more embodiments when a user connects with a particular object, the reverse connection (i.e., from the object back to the user) is automatically performed resulting in the display of symbol 708. For example, if a user connects to/creates a song mix, there will automatically be a two-way relationship that results.

As an alternative to the symbols 702-708 of FIG. 7, other graphical user interface elements may reflect the connection status of the invention. For example, a chain with links of a chain closing (indicating a connection) and/or different arrangements of broken and closed links may be utilized.

When a user holds a mouse cursor over a connect symbol 702-708, information/options that are context sensitive to that particular connection may be displayed (e.g., in an H-card or other dialog box/display window). The information/options may be displayed in a variety of manners. For example, the information/options may be displayed within a drop-down menu with several options to engage with the connected object/person outside of connecting. For example, if the user hovers over a song, the options may display options that are relevant to songs including the connection status, an option to add the song to a playlist, to play the song, to create a radio mix with that song, share the song (e.g., on the user's stream or with a particular set of users), report a song (if its improperly tagged or has the wrong information), make the song the user's profile song, etc. Similarly, if a user hovers over a connect icon associated with another user, options may include "connect" and "share" (which may share the user's profile over the current user's stream) (e.g., with the option to make a comment such as "cool user profile").

In one or more embodiments, the concept of sharing (both internally and external broadcast to other sites/services) may be incorporated within the set of dialogs and behaviors of the connect feature/control. For example, upon connection to a resource, the dialog may prompt the user whether he/she'd like this connection to be broadcasted to Facebook™/YouTube™, etc. (depending on that user's connect/privacy settings). In this regard, broadcasting a connection is synonymous with sharing, and will facilitate the viral spread of content in precisely the same manner. Additionally, "thumbs up" and "thumbs down" activities may also be incorporated into the connect feature/control. For example, upon mouse-over of the universal connect icon/symbol, a dialog may prompt the user with questions such as "Connect to more content like this?" or "Connect to less content like this?". The response to this set of carefully worded questions may provide similar utility as "thumbs up" and "thumbs down" controls.

Tag Inheritance

The basic premise of tag inheritance is that users and resources exchange affinities with one another by way of their interactions. The underlying assumption is that there is always a reason a user will interact with a resource (song, video, etc.), and ultimately this interaction indicates that there are things in common between them. In other words, tag inheritance is an exemplary process of identifying/altering affinities for resources and users in real time via the collection of stream data. This is accomplished through analyzing the behavior of users in a system.

By employing the system of tag inheritance, affinities may be calculated to represent the weights of tags against corresponding resources in the system. Such an affinity calculation is described in further below.

Figure 8:
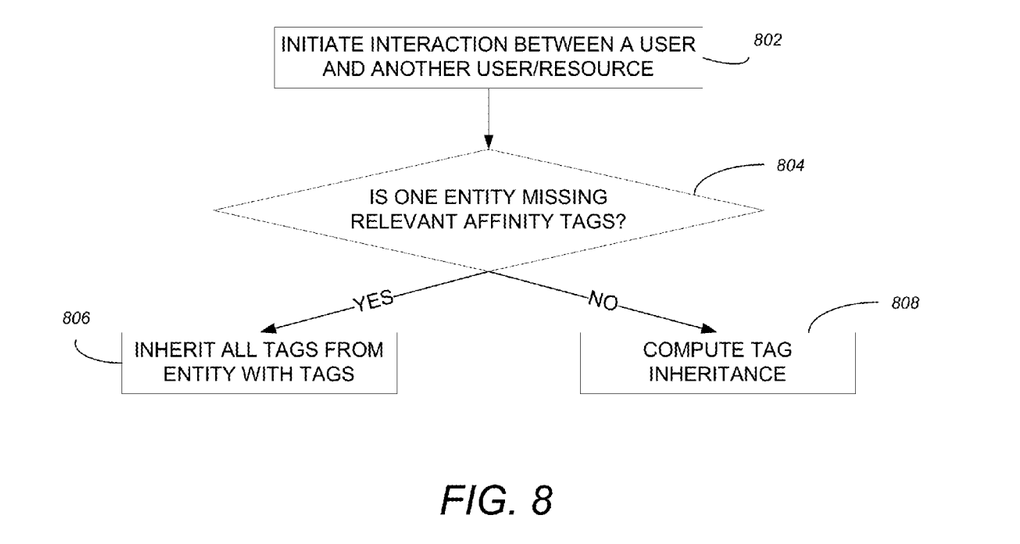
FIG. 8 illustrates the logical flow for providing an affinity between a first entity and a second entity on a social network in accordance with one or more embodiments of the invention.

A key exemplary concept of an inheritance methodology is that users and resources inherit affinities from one another as interactions occur. Further, affinities are represented as tags. FIG. 8 illustrates the logical flow for inheriting tags in accordance with one or more embodiments of the invention.

At step 802, an interaction between a user and another user/resource/content is initiated/conducted.

At step 804, a determination is made regarding whether one of the interacting entities is missing/does not have relevant affinity tags. In this regard, whether a tag is relevant is based on the interaction and type of entities. For example, if a user is interacting with a song, and a user's affinity tag indicates a preference for restaurants located in Boston, such a tag would not be relevant to the interaction between the user and the song. However, if the user is interacting with the song and a user's affinity tag is categorized as a genre tag and indicates a 30% affinity for country music, such a tag would be relevant. Thus, the relevancy of a tag is based on the type of entities that are interacting with each other (and the categorization of the tag itself [e.g., genre, sports, food, people. etc.]).

If one of the interacting entities does not have a relevant affinity tag, such an entity inherits all of the tags from the entity with the tags at step 806. Example 1 illustrates the concept of steps 804-806:

Example 1

1. User A has no tags
2. Song 1 has the following genre tags:
   a. Rock: 70% affinity
   b. Country: 30% affinity
3. User A plays Song 1
4. User A inherits the following tags:
   a. Rock: 70% affinity
   b. Country: 30% affinity In Example 1, Song 1 does not inherit any tags (because User A has no tags for Song 1 to inherit). Example 2 also illustrates the concepts of steps 804-806:

Example 2

1. User A has the following tags
   a. Rock: 35% affinity
   b. Country: 15% affinity
   c. Soul: 30% affinity
   d. Hip Hop: 20% affinity
2. Song 3 has no tags
3. User A plays Song 3
4. Song 3 inherits from User A and has the following tags:
   a. Rock: 35% affinity
   b. Country: 15% affinity
   c. Soul: 30% affinity
   d. Hip Hop: 20% affinity In contrast, if both interacting entities have relevant affinity tags, both entities inherit tags of the other entity. Further, such an inheritance may affect the existing tags of the entity. Accordingly, the how and what tags are inherited may be computed at step 808. Such a computation may be performed based on a number of methodologies.

Example 3 illustrates one manner in which tags may be inherited by a user interacting with a song.

Example 3

1. User A has the following tags
   a. Rock: 70% affinity
   b. Country: 30% affinity
2. Song 2 has the following genre tags:
   a. Soul: 60% affinity
   b. Hip Hop: 40% affinity
3. User A plays Song 2
4. User A inherits tags from Song 2 and has the following tags:
   a. Rock: 35% affinity
   b. Country: 15% affinity
   c. Soul: 30% affinity
   d. Hip Hop: 20% affinity
5. Song 2 inherits from User A and has the following tags:
   a. Rock: 35% affinity
   b. Country: 15% affinity
   c. Soul: 30% affinity
   d. Hip Hop: 20% affinity Thus, both User A and Song 2 inherit tags from each other and the existing tags are modified based on such an inheritance. It may further be noted that the type of interaction may also affect whether tags are inherited and the methodology used to compute the inheritance. For example, if a user plays a song, such a play interaction may partially affect the user's affinity tags. In contrast, if a user "connect" with or "likes" a song, such an interaction may have a greater impact on the user's affinity tags. A similar affect may result if a user merely watches a comedian's uploaded video versus the user "connecting", "following", "friending", or "liking" the comedian or the comedian's video.

The amount one resource inherits from another may be determined by the strength of the tag, which is the percentage. That percentage may be converted to a raw score to be used in the calculation of the new percentages for each respective resource. Example 4 illustrates the conversion and use of raw scores in accordance with one or more embodiments of the invention:

Example 4

1. User A has the following tags:
   a. Rock: 70%—Raw Score: 0.7
   b. Country: 30%—Raw Score: 0.3
   c. Total Raw Score: 1.00
2. Song 1 has the following Tag:
   a. Soul: 60% affinity—Raw Score: 0.6
   b. Hip Hop: 40% affinity—Raw Score: 0.4
   c. Total Raw Score: 1.00
3. User A plays Song 1
4. Updates to User A
   a. Raw Score increases by 1.00 (0.6 from Soul & 0.4 from Hip Hop)
   b. New Raw Score total: 2.00
   c. Rock: 35%=(0.7/2.00)*100
   d. Country: 15%=(0.3/2.00)*100
   e. Soul: 30%=(0.6/2.00)*100
   f. Hip Hop: 20%=(0.4/2.00)*100
5. Updates to Song 1—Same formula as above Accordingly, to compute the affinity values, the total raw score value is incremented, and the remaining raw score for each tag is divided by the new total raw score. Further, this new total raw score and adjusted values may be maintained as part of the tags associated with the user/entity. Thus, following example 4, if User A interacts with another song—Song 2, User A's initial raw score would be 2.0 and then combined with the total raw score of Song 2.

Alternatively, the raw score values may first be normalized prior to combining. In this regard, the values of the entity being updated would be normalized by its total raw score while the entity it is interacting with would be normalized to a value of 1.0. As an example, when combining/computing the affinities of User A with Song 2, User A's initial raw score would be 2.0 (and it's affinity values would be normalized) but the raw score of Song 2 would first be normalized to 1.0 and then combined. Example 5: illustrates such a scenario:

Example 5

1. User A has the following tags:
   a. Rock: 70%—Raw Score: 1.4 (0.7*2)
   b. Country: 30%—Raw Score: 0.6 (0.3*2)
   c. Total Raw Score: 2.00
2. Song 1 has the following Tag:
   a. Soul: 60% affinity—Raw Score: 1.2 (0.6*2)
   b. Hip Hop: 40% affinity—Raw Score: 0.8 (0.4*2)
   c. Total Raw Score: 2.00

3. User A plays Song 1
4. Updates to User A
   a. Normalize Song 1's raw scores to 1.00
      a. Soul: 60% affinity—Raw Score: 0.6 (0.6*1)
      b. Hip Hop: 40% affinity—Raw Score: 0.4 (0.4*1)
      c. Total Raw Score: 1.00
   b. Raw Score (of User A) increases by 1.00
   c. New Raw Score total: 3.00
   d. Rock: 47%=(1.4/3.00)*100
   e. Country: 20%=(0.6/3.00)*100
   f. Soul: 20%=(0.6/3.00)*100
   g. Hip Hop: 13%=(0.4/3.00)*100
5. Updates to Song 1—Same formula as above but the total raw score of User A is normalized to 1 and Song before updating Song 1's tags.

As illustrated by Example 5, as a user plays more songs and develops a set of affinity tags, subsequent song plays would not have as great of an impact on the user's affinity tags.

While the above reflects one method for combining/computing affinity tags, embodiments of the invention are not limited to any particular method but instead are directed towards the concept of tags being inherited based on interactions between a user and another user/entity.

In alternative/exemplary embodiments, a resource can only pass on a tag to another resource if it has inheritance occurrence count of X. That X is a configured value and the purpose of this logic is to minimize the exacerbation of user choices that are not representative or their preferences. The amount inherited per tag may decay proportionally in percentage from the inheritance distance level of the originally seeded tag. In addition, a user may only pass on its tags to a resource once every X interval. Such a configuration prevents the possibility of a user passing on its tags multiple times, which results in the possible scenario of the resource having strong improper characterizations.

The above examples use genre as the tag type, but the system is designed to handle any number of Tag Types. For example: Locations, Age, Gender, and User Entered Free Text tags (e.g., Hash tags), among others. Exemplary uses for this include, but are not limited to song recommendations (e.g., in Radio Mode) and event recommendations.

In addition to the above, the z-score (which is generated from the normal distribution graph comprised of the scores of a specific tag across the entire population) may be used to order applicable tags when calculating affinity between two resources.

Based on the above description, tag inheritance may be utilized in a variety of different scenarios. As an example, tag inheritance may be used to generate a similarity score between two objects (e.g., user to user, user to content, and/or content to content). In addition, tag inheritance may be used to recommend resources to users (e.g., songs, videos, pictures, etc.). Further, tag inheritance may be used to provide user-to-user recommendations.

To provide recommendations utilizing tag inheritance, a variety of different methodologies may be utilized. As an example, a list of candidate resources may be generated by a method of matching tag patterns from an inputted set of tags to an entire tag inheritance repository (referred to as "Tag Patterns"). Alternatively, a more granular ranking and sorting can be performed by comparing the inputted tags against all of the tags of the candidate resources to generate a similarity score.

In view of the above, the general concept of tag inheritance is that two entities (e.g., a user and another user/resource/object) interact with each other and such an interaction results in the exchanging of tags associated with each entity. Different methodologies may be used to weigh how much one entity will inherit a tag from another entity based on the overall set of tags that an entity has. Accordingly, if a song already has fifty (50) different genre tags, playing the song may have a small effect. Similarly, if the song has a large amount of rock influence already applied, and the user has a very strong rock affiliation, then it may further weight the rock affiliation of the song (and the user).

Logical Flow

Figure 9:
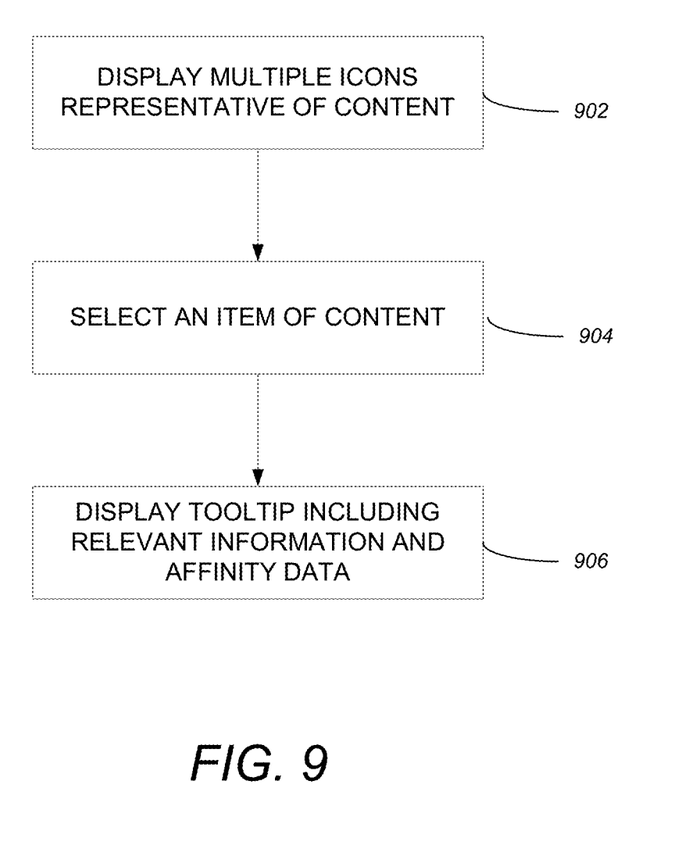
FIG. 9 illustrates the logical flow for displaying information about selected content in a social network.

FIG. 9 illustrates the logical flow for displaying information about selected content in a social network.

At step 902, multiple icons representative of content (e.g., multiple users, songs, videos, mixes, etc.) are displayed via the social network.

At step 904, an item of the content is selected via input from a user. Such an item is selected by selecting one of the multiple icons (e.g., by hovering over one of the icons with a cursor without clicking)

At step 906, in response to the selecting, a tooltip is displayed. The tooltip includes relevant information about the selected item and affinity data. The affinity data defines/identifies a probability of similar interests between the user and the selected item. Further, the affinity data may be a computed numeric value/percentage and/or a Venn diagram (where a percentage of overlap of overlapping circles of the Venn diagram represents a computed affinity between the user and the selected item). As illustrated in the figures, the computed numeric value/percentage may be overlaid as text on top of/transparently with the Venn diagram (e.g., see FIGS. 5 and 6). As described above, the affinity may be computed/defined as an average, mean, or any other type of computation. Further, the affinity may consist of both a behavioral affinity and a categorical affinity.

The tooltip may also include a connection status between the user and the selected item. Such a connection status reflects both one-way connections between the user to and from the selected item. Further, the tooltip may include recommendations, computed for the user, for additional content similar to the selected item on the social network.

Based on the affinity data displayed in the h-card/tooltip, embodiments of the invention enable the user to view and determine how similar the user's interests are with a specific user, artist, or piece/item of content. Accordingly, before the user connects with or associates with such a user/artist/piece of content, the user can view a computed likelihood of whether such a user/artist/piece of content will be something the user actually likes.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for displaying information about selected content in a social network comprising:
- displaying, via the social network, multiple icons representative of content;
- selecting, via input from a user, an item of the content via selection of one of the multiple icons; and
- in response to the selecting, displaying a tooltip, wherein:
  - the tooltip comprises relevant information about the selected item;
  - the tooltip comprises affinity data comprising a probability of similar interests between the user and the selected item;
  - the affinity data comprises a Venn diagram;
  - a percentage of overlap of overlapping circles of the Venn diagram represents a computed affinity between the user and the selected item;
  - the tooltip comprises overlapping graphic symbols representing a connection status between the user and the selected item;
  - the connection status comprises a first status of a first one-way connection between the user and the selected item;
  - the connection status comprises a second status of a second one-way connection between the selected item and the user; and
  - the overlapping graphic symbols simultaneously represent both the first status and the second status.

2. The computer-implemented method of claim 1, wherein the content comprises multiple additional users.

3. The computer-implemented method of claim 1, wherein the content comprises songs.

4. The computer-implemented method of claim 1, wherein the selecting comprises hovering over one of the multiple icons with a cursor without clicking.

5. The computer-implemented method of claim 1, wherein the affinity data comprises a computed numeric value.

6. The computer-implemented method of claim 1, wherein the tooltip further comprises one or more recommendations, computed for the user, for additional content similar to the selected item on the social network.

7. The computer-implemented method of claim 1, wherein the user has not connected with the selected item prior to the selecting and displaying steps.

8. A system for displaying information about selected content in a social network comprising:
(a) a server computer;
(b) a social network application executing on the computer; wherein the social network application is configured to:
 (1) display multiple icons representative of content;
 (2) select, via input from a user, an item of the content via selection of one of the multiple icons; and
 (3) in response to the selection, display a tooltip, wherein:
  (i) the tooltip comprises relevant information about the selected item;
  (ii) the tooltip comprises affinity data comprising a probability of similar interests between the user and the selected item
  (iii) the affinity data comprises a Venn diagram;
  (iv) a percentage of overlap of overlapping circles of the Venn diagram represents a computed affinity between the user and the selected item;
  (v) the tooltip comprises overlapping graphic symbols representing a connection status between the user and the selected item;
  (vi) the connection status comprises a first status of a first one-way connection between the user and the selected item;
  (vii) the connection status comprises a second status of a second one-way connection between the selected item and the user; and
  (viii) the overlapping graphic symbols simultaneously represent both the first status and the second status.

9. The system of claim 8, wherein the content comprises multiple additional users.

10. The system of claim 8, wherein the content comprises songs.

11. The system of claim 8, wherein the social network application is configured to select the item by hovering over one of the multiple icons with a cursor without clicking.

12. The system of claim 8, wherein the affinity data comprises a computed numeric value.

13. The system of claim 8, wherein the tooltip further comprises one or more recommendations, computed for the user, for additional content similar to the selected item on the social network.

14. The system of claim 8, wherein the user has not connected with the selected item prior to the selecting and displaying steps.

* * * * *